United States Patent

[11] 3,619,226

| [72] | Inventors | Chester Arthur Hargreaves, II;<br>Franklin Luckenbill Montgomery, both of<br>Wilmington, Del. |
|---|---|---|
| [21] | Appl. No. | 646,497 |
| [22] | Filed | June 16, 1967 |
| [45] | Patented | Nov. 9, 1971 |
| [73] | Assignee | E. I. du Pont de Nemours and Company<br>Wilmington, Del. |

[54] FLUID, NONCRYSTALLINE CHLOROPRENE COPOLYMERS
2 Claims, No Drawings

| [52] | U.S. Cl. | 106/287, 260/79.5, 260/92.3 |
|---|---|---|
| [51] | Int. Cl. | C08h 17/26 |
| [50] | Field of Search | 106/287 S; 260/30.8, 92.3, 79.5, 79.7 |

[56] References Cited
UNITED STATES PATENTS

| 3,105,055 | 9/1963 | Aho | 260/92.3 |
|---|---|---|---|
| 3,378,538 | 4/1968 | Sparks | 260/92.3 |

FOREIGN PATENTS

| 6,512,757 | 4/1966 | Netherlands |
|---|---|---|
| 905,971 | 9/1962 | Great Britain |

*Primary Examiner*—Lorenzo B. Hayes
*Attorney*—Fred C. Carlson

ABSTRACT: The present invention is directed to a novel copolymer of (1) chloroprene monomer and (2) a copolymerizable monomer, said copolymer being prepared by polymerizing an aqueous emulsion of said monomers to 90 to 100 percent monomer conversion in the presence of from about 0.2 to about 0.6 parts of sulfur and an amount of a dialkyl xanthogen disulfide equivalent to about 4 to about 15 parts diethyl xanthogen disulfide; parts are by weight per 100 parts of total monomers.

FLUID, NONCRYSTALLINE CHLOROPRENE COPOLYMERS

BACKGROUND OF THE INVENTION

It is known that chloroprene polymers of low molecular weight may be prepared by polymerizing chloroprene in the presence of relatively large amounts of a dialkyl xanthogen disulfide modifying agent. For example, British Pat. specification 905,971 discloses the preparation of a chloroprene polymer by polymerizing chloroprene, optionally with up to 20 percent of a comonomer, in the presence of 5-18 parts by weight, per 100 parts of monomer, of a dialkyl xanthogen disulfide. The preferred comonomer is said to be 2,3-dichloro-1,3-butadiene.

For certain uses of fluid polymers it is essential to have a polymer which will remain fluid at ambient temperatures and, for this reason, it is found essential to provide a copolymer of chloroprene containing a critical amount of comonomer to improve the resistance to crystallization.

In addition, it has been found that it is essential that the copolymers by prepared in the presence of a critical amount of sulfur if they are to maintain, on aging, satisfactory tensile properties.

DESCRIPTION OF THE INVENTION

More specifically, this invention is directed to a composition which is a copolymer comprising essentially, 80-95 mole percent of (1) chloroprene and 5-20 mole percent of (2) another copolymerizable monomer, which has been prepared by polymerization of an aqueous emulsion of the monomers to 90-100 percent monomer conversion in the presence of 0.20 to 0.60 parts of sulfur and an amount of a dialkyl xanthogen disulfide equivalent to four to 15 parts diethyl xanthogen disulfide, parts being by weight per 100 parts of monomers.

The comonomers that may be copolymerized with chloroprene include acrylonitrile, methacrylonitrile, esters of acrylic acid and methacrylic acid, monovinyl aromatic compounds such as styrene, and 2,3-dichloro-1,3-butadiene. Of these, 2,3-dichloro-1,3-butadiene is the preferred monomer because it is particularly effective in producing crystallization-resistant copolymers with chloroprene. If less than about 5 mole percent of the comonomer is present, the copolymer will not have sufficient resistance to crystallization; that is, it will tend to become a solid at ambient temperatures, and its usefulness as a fluid, low-molecular-weight polymer will be limited. If more than about 20 mole percent of another copolymerizable monomer is present, the crystallization resistance is not significantly improved, and the copolymers tend to become undesirably viscous. It is to be understood that different comonomers will vary somewhat in their effectiveness in imparting resistance to crystallization to the copolymer.

The critical amount of sulfur to be present in the polymerization is 0.20 to 0.60 parts per 100 parts of monomer. If less than 0.20 part of sulfur is present, the final cured copolymer will not maintain adequate tensile strength on aging. If, however, more than 0.6 part of sulfur is present, the polymers do not cure satisfactorily.

The dialkyl xanthogen disulfides that may be used in preparing the fluid chloroprene polymers of this invention have the general formula

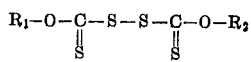

in which $R_1$ and $R_2$ are alkyl groups containing one to eight carbon atoms. Examples of suitable compounds are dimethyl xanthogen disulfide, diethyl xanthogen disulfide, diisopropyl xanthogen disulfide, the dibutyl xanthogen disulfides, and bis(2-ethylhexyl) xanthogen disulfide. The preferred compounds are those in which each alkyl group has one to four carbon atoms.

Four parts of diethyl xanthogen disulfide per 100 parts of monomers is the minimum amount that may be used to produce polymers of the desired fluidity. The improvement in polymer fluidity by using more than about 15 parts of diethyl xanthogen disulfide is nearly insignificant and, accordingly, this modifier concentration represents a practical upper limit. The amount of the different dialkyl xanthogen disulfides will vary somewhat with molecular weight. Also, for an unknown reason, there are small differences in the modifying effectiveness among molecularly equivalent amounts of various dialkyl xanthogen disulfides. For this reason, the amount of dialkyl xanthogen disulfide has been defined in terms of the amount equivalent to diethyl xanthogen disulfide. To determine the equivalent amounts of other dialkyl xanthogen disulfides, one may, for example, plot the viscosities of polymers prepared in the presence of varying amounts of a particular xanthogen disulfide and compare the graph with that from a similar one prepared when diethyl xanthogen disulfide is used. In general, the desired amount will fall within the range of about four to about 15 parts by weight, with some allowances in the upper and lower limits of the range to allow for higher and lower molecular weights and for variations in effectiveness.

Processes which may be substantially utilized for preparing the invention copolymers include those of U.S. Pat. No. 3,190,865 and British Pat. 905,971.

An effective process for preparing the copolymers of this invention includes that process wherein two emulsions "A" and "B" are prepared containing the respective monomers and modifiers in the proportions herein defined followed by initiating polymerization in emulsion "A" followed by adding the emulsion "B" incrementally or continuously to the reaction vessel. The rate of addition is not critical. However, it is preferred to add the second emulsion at such a rate that the total monomer conversion (as indicated, for example, by specific gravity) increases approximately steadily throughout the polymerization. In this process, at least half of the modifying agent should be present in the initial emulsion containing only 25 to 45 percent of the chloroprene monomer to produce polymers having significantly lower viscosities as compared with those processes wherein the ratio of modifier to monomer is maintained constant during the incremental addition or in those processes wherein the predominant amount of modifier is added incrementally during the polymerization. This process may be modified by having present a major amount of the less readily copolymerizable monomer in the first emulsion.

In this polymerization, conventional emulsifying agents which may be utilized are those disclosed on page 1, lines 70 to 88 of British Pat. 905,971.

The pH of the emulsion should be between five and 11, preferably between six and 10. The optimum pH will depend somewhat on the emulsifying system being used as will be apparent to those skilled in the art.

The conventional free-radical generating catalysts for chloroprene polymerizations may be used. These include organic and inorganic peroxy compounds, such as the water soluble persulfates, hydrogen peroxide and organic hydroperoxides and peroxides, such as cumene hydroperoxide ($\alpha,\alpha$-dimethylbenzyl hydroperoxide) and dibenzoyl peroxide. Rate of polymerization may be improved by the presence of suitable reducing agents, such as those disclosed in U.S. Pat. No. 3,190,865.

The polymerization may be carried out between 0° and 80° C. The preferred temperature is between 20° and 55° C.

The concentration of organic monomer present in the aqueous emulsion is not critical. In general, 30 to 60 percent, by weight based on the total weight of the emulsion, is the range of concentration of organic monomer used in the preparation of polymer.

Preparation of emulsions and polymerization are carried out in an inert atmosphere, usually in an atmosphere of nitrogen.

Polymerization should be carried out to 90 to 100 percent monomer conversion in order to incorporate the desired amount of sulfur. If only 0.2 part of sulfur is present, polymerization should be carried out essentially to completion.

The polymer may be isolated by conventional methods, such as by drum drying as disclosed in U.S. Pat. No. 2,914,497, or by coagulating the solid polymer and separating from the aqueous phase. The method of U.S. Pat. No. 2,857,962 may also be used for isolating polymer.

The polymers of this invention may be utilized for the same purposes described in B. 905,971 (page 2, lines 36 through 93). Curing may be effected by treatment with amines as disclosed in B. 905,971 or, optionally, the polymers may be cured using the conventional compounding agents including zinc oxide and magnesia as disclosed in Murray and Thompson, "The Neoprenes," E. I. du Pont de Nemours and Company, 1963.

The following representative examples further illustrate the present invention.

EXAMPLE 1

A series of experiments is carried out using the following procedure. (All operations are carried out in a nitrogen atmosphere. Polymerization temperature is 40° C.)

In each experiment two emulsions are prepared having the following composition:

|  | Parts by Weight |  |
|---|---|---|
|  | A | B |
| Chloroprene | 31.3 | 53.7 |
| 2,3-Dichloro-1,3-butadiene | 1.7 | 13.3 |
| Diethyl xanthogen disulfide | 8 | 2 |
| Sulfur | (a) | (a) |
| Oleic acid | 2 | 1.8 |
| Cumene hydroperoxide (71%) | 0.33 | 0 |
| Water | 106.7 | 33.3 |
| Potassium hydroxide | 0.147 | 0.187 |
| Aqueous ammonia (29%) | 0.24 | 0 |
| Sodium salt of formaldehydenaphthalenesulfonic acid condensate | 0.5 | 0 |

(a) As shown in table I

Polymerization of Emulsion A is initiated and maintained by addition of a solution having the following composition:

|  | Parts by Weight |
|---|---|
| Water | 10 |
| Aqueous ammonia (29%) | 1 |
| Sodium hydrosulfite (90% assay) | 0.5 |

When specific gravity of the emulsion has reached 1.015 (at 40° C.) addition of Emulsion B is begun and continued at a rate such that the specific gravity of the polymerizing emulsion has reached 1.075 (at 40° C.) (about 2.5 hours). The polymerization is then continued until no further increase in specific gravity is obtained. 1.3 Parts of a stabilizing emulsion is then added containing 1.0 percent phenothiazine and 1.0 percent of 4-tert-butylpyrocatechol. The polymers are isolated by drum drying, which is carried out on an 8-inch Chromium-plated, double drum drier which is internally heated with steam.

The polymers are thoroughly mixed with compounding ingredients using the following recipe:

|  | Parts by Weight |
|---|---|
| Polymer | 100 |
| N-Phenyl-2-naphthylamine | 2 |
| Zinc oxide | 4 |
| Lead dioxide paste* | 12 |
| Piperazine paste* | 12 |

*50% dispersion in bis(2-ethylhexyl) sebacate (any inert oil may be used such as hydrocarbon oils).

The compounded polymers are thoroughly mixed with the compounding ingredients and allowed to cure at room temperature for one week. The stress-strain properties are then measured by ASTM Method D-412-64 T using an Instron tensile strength testing machine.

Samples are then aged one week at 70° C. in an air oven and stress-strain properties are again measured.

Table I shows the amount of sulfur present in the polymerization system and gives the Brookfield viscosities of the polymers and stress-strain data.

TABLE I

|  | Experiment | | | | | |
|---|---|---|---|---|---|---|
|  | 1-A | | 1-B | | 1-C | |
| Emulsion | A | B | A | B | A | B |
| Sulfur present in recipe | 0.20 | 0.05 | 0.20 | 0.3 | 0.2 | 0.55 |
| Brookfield viscosity at 26° C., centipoises | 71,000 | | 52,000 | | 51,000 | |
| Stress-strain properties: | | | | | | |
| After curing one week: | | | | | | |
|   Modulus at 300% elongation, p.s.i. | 115 | | 60 | | 35 | |
|   Tensile strength at break, p.s.i. | 185 | | 225 | | | |
|   Elongation at break, percent | 520 | | 900 | | >1,000 | |
| After aging 1 week at 70° C.: | | | | | | |
|   Modulus at 300% | | | 80 | | 45 | |
|   Tensile strength at break, p.s.i. | 130 | | 160 | | 200 | |
|   Elongation at break, percent | 290 | | 600 | | 980 | |

From the above data it can be seen that the polymer 1-C, which does not come within the invention because of the large amount of sulfur used in the polymerization, does not cure at room temperature to an elastomer having adequate modulus. Even after aging at 70° C. for one week the modulus is still undesirably low. On the other hand, the polymers 1-A and 1-B give vulcanizates at room temperature having stress-strain properties quite adequate for uses such as caulks and sealants. However, on aging, polymer 1-A has a lower elongation. While this is adequate for many purposes, polymers having less than 0.20 parts of sulfur will be unsatisfactory in this respect.

EXAMPLE 2

A polymerization is carried out as in example 1 except that the following emulsion compositions are used:

|  | Parts by Weight | |
|---|---|---|
| Emulsion | A | B |
| Chloroprene | 35 | 50 |
| 2,3-Dichloro-1,3-butadiene | 2 | 13 |
| Diethyl xanthogen disulfide | 7 | 1 |
| Sulfur | 0.35 | 0 |
| Oleic acid | 2 | 1.8 |
| Cumene hydroperoxide (71%) | 0.37 | 0 |
| Water | 107 | 33 |
| Potassium hydroxide | 0.147 | 0.187 |
| Aqueous ammonia (29%) | 0.3 | 0 |
| Sodium salt of formaldehyde naphthalenesulfonic acid condensate | 0.5 | 0 |

The isolated polymer has a Brookfield viscosity of 110,000 centipoises at 25° C.

The polymer is compounded using the following recipe

| | Parts by Weight |
|---|---|
| Polymer | 100 |
| N-Phenyl-2-naphthylamine | 2 |
| Zinc oxide | 4 |
| Lead Dioxide paste* | 8 |
| Piperazine paste* | 12 |

*same as in example 1

The tensile properties are obtained as in example 1 after the polymer samples have first cured at 25° C. for one week (Sample A) and again after these cured samples are aged at 70° C. for one week in an air oven (Sample B). table II shows the data:

TABLE II

| Tensile Properties | Samples | |
|---|---|---|
| | A | B |
| Modulus at 300% elongation, p.s.i. | 65 | 105 |
| Modulus at 600% elongation, p.s.i. | 95 | 190 |
| Tensile strength at break, p.s.i. | 375 | 270 |
| Elongation at break, % | 1,000 | 680 |

As stated heretofore, one significant characteristic of the noncrystalline invention polymer product is that a more fluid polymer is provided. The practical significance of this increased fluidity is that said elastomers which are truly fluid are those readily pourable at room temperature and which can be vulcanized at ordinary temperatures; such elastomers offer significant processing advantages to the trade practicing in this field. Furthermore, the need for expensive compounding and vulcanizing equipment is obviated as said compounding can be carried out with relatively light-duty mixers at the site of application of the elastomer and vulcanization can be accomplished without the usual requirements of elevated temperature and pressure.

The preceding representative examples may be varied within the scope of the present total specification disclosure, as understood and practiced by one skilled in the art to achieve essentially the same results.

As many apparently widely different embodiments of this invention may be made without departing from the spirit and scope thereof, it is to be understood that this invention is not limited to the specific embodiments thereof except as defined in the appended claims.

The embodiments of the invention in which an exclusive property or privilege is claimed are as follows:

1. A fluid, noncrystalline copolymer composition comprising a sulfur-containing copolymer of chloroprene monomer and a monomer selected from the group consisting of acrylonitrile, methacrylonitrile, esters of acrylic and methacrylic acids, 2,3-dichloro-1,3-butadiene, and styrene, said monomers being in the proportion of 80 to 95 mole percent of chloroprene and 20 to 5 mole percent of the other monomer, the copolymer having been produced by polymerizing said monomers to 90 to 100 percent total monomer conversion in an aqueous emulsion containing, by weight per 100 parts by weight of monomers, from 0.2 to 0.6 parts of sulfur and an amount of a dialkyl xanthogen disulfide, having one to eight carbon atoms in each alkyl group, equivalent to about from four to 15 parts of diethyl xanthogen disulfide.

2. A composition according to claim 1 wherein said copolymerizable monomer (2) is 2,3-dichloro-1,3-butadiene and said dialkyl xanthogen disulfide is diethyl xanthogen disulfide.

* * * * *